United States Patent
Tessier et al.

(10) Patent No.: US 7,044,700 B2
(45) Date of Patent: May 16, 2006

(54) SYSTEM AND METHOD FOR STRAPPING A LOAD

(75) Inventors: Jacques Tessier, St. Pierre-Jolys (CA); Willi Hesse, Dufrost (CA)

(73) Assignee: Willi Hermann Hesse, Ste. Anne (CA)

( * ) Notice: Subject to any disclaimer, the term of this patent is extended or adjusted under 35 U.S.C. 154(b) by 0 days.

(21) Appl. No.: 10/978,524

(22) Filed: Nov. 2, 2004

(65) Prior Publication Data

US 2005/0111929 A1 May 26, 2005

(30) Foreign Application Priority Data

Nov. 21, 2003 (CA) .................... 2450341

(51) Int. Cl.
*B61D 45/00* (2006.01)

(52) U.S. Cl. ...................... 410/100; 410/103

(58) Field of Classification Search ............... 410/100, 410/97, 98, 103, 34, 117
See application file for complete search history.

(56) References Cited

U.S. PATENT DOCUMENTS

| | | | |
|---|---|---|---|
| 4,037,870 A | | 7/1977 | O'Neal |
| 5,024,567 A | * | 6/1991 | Dominguez et al. ........ 410/100 |
| 5,186,586 A | * | 2/1993 | Stephenson, Jr. ........... 410/100 |
| 5,193,955 A | * | 3/1993 | Chou ......................... 410/100 |
| 5,458,447 A | * | 10/1995 | Clason ....................... 410/100 |
| 5,466,030 A | | 11/1995 | Harris et al. |
| 5,626,083 A | * | 5/1997 | Saxton ........................ 105/355 |
| 5,692,793 A | | 12/1997 | Wilson et al. |
| 5,876,164 A | * | 3/1999 | Hamelin et al. .............. 410/35 |
| 5,899,646 A | * | 5/1999 | Tatina et al. ................. 410/100 |
| 6,158,932 A | * | 12/2000 | Little .......................... 410/103 |
| 6,283,700 B1 | * | 9/2001 | Oltrogge ..................... 414/607 |
| 6,499,790 B1 | | 12/2002 | Johnston |
| 6,550,398 B1 | * | 4/2003 | Clark et al. .................. 105/404 |
| 6,612,793 B1 | * | 9/2003 | Coslovi et al. ............. 410/100 |
| 6,616,389 B1 | * | 9/2003 | Ament et al. ............... 410/118 |
| 6,709,207 B1 | * | 3/2004 | Forbes ........................ 410/32 |
| 6,712,006 B1 | * | 3/2004 | Clark et al. ................. 105/355 |
| 6,920,829 B1 | * | 7/2005 | Forbes et al. ............... 105/355 |

* cited by examiner

*Primary Examiner*—H. Gutman
(74) *Attorney, Agent, or Firm*—Ryan W. Dupuis; Michael R. Williams; Adrian D. Battison

(57) ABSTRACT

A strapping system is used to strap loads to the deck of trailers and/or trucks. The system includes a pair of rollers supported by a frame above the deck which extend in a longitudinal direction of the deck. Strapping is rolled onto the rollers. Anchors at the free ends of the strapping can be secured along opposing sides of the deck. A tightener in the form of a crank and ratchet mechanism is coupled to the rollers for tensioning the strapping spanning between the rollers and the free ends anchored to the sides of the deck. The load, for example large round bales, is retained beneath the strapping under tension. The tightener permits common tensioning of all strapping of each roller in a single, time saving operation to ensure loads readily secured before transport.

20 Claims, 5 Drawing Sheets

SYSTEM AND METHOD FOR STRAPPING A LOAD

FIELD OF THE INVENTION

The present invention relates to a system and method for strapping a load onto an elongate deck supported for rolling movement along the ground for transporting the load, for example a flat bed trailer and the like.

BACKGROUND

When hauling loads on a flat bed truck or trailer having an elongate deck, it is generally recommended to tie down loads using straps. The deck in this instance is often provided with rails extending along opposing sides of the deck between which straps can be secured when extended overtop the load from side to side of the deck. Securement and tightening of numerous individual straps however is time consuming and may require an operator to dangerously climb over top of a load for placement of the straps. Due to the inconvenience of providing multiple straps, many operators do not secure enough straps overtop of a load so that the load is unstable and causes a safety concern if the load were to come loose during transport.

U.S. Pat. No. 5,692,793 to Wilson et al, U.S. Pat. No. 6,499,790 to Johnston, U.S. Pat. No. 4,037,870 to O'Neal and U.S. Pat. No. 5,466,030 to Harris et al disclose various examples of trucks or trailers in which an enclosure is provided over the deck for containing loads. In most instances however these devices relate only to covers which are not intended for securely strapping a load and none are suitably arranged for being supported on a flat bed type truck or trailer. Furthermore tightening of the covers in each instance typically requires multiple steps so that operators may not sufficiently secure a load.

SUMMARY

According to one aspect of the present invention there is provided a strapping system for an elongate deck supported for rolling movement along the ground in a longitudinal direction of the deck for transporting loads supported thereon, the system comprising:

a pair of elongate rollers;

a frame for supporting the rollers parallel to one another to extend in the longitudinal direction of the deck spaced above the deck, each roller being supported on the frame for rotation about a respective longitudinal axis;

strapping members, each secured to a respective one of the rollers at respective inner ends thereof and spanning outwardly to respective free outer ends thereof;

anchors supported at the free outer ends of the respective strapping members for securing the strapping members along respective sides of the deck; and a tightening mechanism coupled to the rollers to rotate the rollers for tensioning the strapping members spanning between the rollers and the respective sides of the deck when the strapping members are rolled onto the respective rollers.

The use of a tightening mechanism cooperating with the roller ensures that all strapping members are tightened together in a single operation on each side of the trailer for thoroughly strapping a load in a safe and secure manner. All individual straps of the strapping member are commonly mounted on the roller on each side so that the straps are unrolled together. An operator is accordingly not required to climb overtop of the load and furthermore the operator is unlikely to only partially strap a load. Providing anchors at the free ends of the strapping members provides convenience as the operator is not required to reach overtop of the load for the anchoring operation either.

According to a second aspect of the present invention there is provided a trailer comprising:

an elongate deck supported for rolling movement along the ground in a longitudinal direction of the deck for transporting loads supported thereon;

a pair of elongate rollers;

a frame supporting the rollers parallel to one another to extend in the longitudinal direction of the deck spaced above the deck, each roller being supported on the frame for rotation about a respective longitudinal axis;

strapping members, each secured to a respective one of the rollers at respective inner ends thereof and spanning outwardly to respective free outer ends thereof;

anchors supported at the free outer ends of the respective strapping members for securing the strapping members along respective sides of the deck; and a tightening mechanism coupled to the rollers to rotate the rollers for tensioning the strapping members spanning between the rollers and the respective sides of the deck when the strapping members are rolled onto the respective rollers.

According to a third aspect of the present invention there is provided a method of strapping a load supported on an elongate deck which is supported for rolling movement along the ground in a longitudinal direction of the deck, the method comprising:

providing a pair of elongate rollers supported parallel to one another to extend in the longitudinal direction of the deck spaced above the deck for rotation about a respective longitudinal axis;

providing strapping members, each secured to a respective one of the rollers at respective inner ends thereof and spanning outwardly to respective free outer ends thereof;

anchoring the free outer ends of the respective strapping members along respective sides of the deck;

rotating the rollers to provide tension to the strapping members spanning between the rollers and the respective sides of the deck as the strapping members are rolled onto the respective rollers.

The strapping members secured on each roller preferably comprise a web of vertical straps and horizontal straps wherein the vertical straps and the horizontal straps are connected at each intersection. The free end of each of the vertical straps may include an anchor for securement to the respective side of the deck. When rails extend along respective sides of the deck, the strapping material and anchors are preferably secured to the rail.

A crank and a ratcheting mechanism may be connected to the rollers for providing tension to the strapping material when the strapping members are anchored to respective sides of the deck. The crank can be coupled to the rollers by a chain drive or an elongate rod so permit an operator to remain standing on the ground near the rear of the deck while rotating the rollers at the top of the trailer.

Each roller may comprise a tubular body supported about a rod member projecting concentrically from the tubular body at respective ends thereof. The method in this instance includes providing a frame to support the rollers on the deck and supporting the rod members in respective bearings on the frame.

When a frame supports the rollers on the deck, the frame preferably includes a pair of end supports supported at opposing ends of the deck upon which the rollers are supported by respective bearings.

The frame may include one or more intermediate supports supported on the deck spaced between the end supports. The rollers in this instance are supported in sections spanning between adjacent ones of the supports and are supported by respective bearings on both the intermediate and end supports. The rollers thus remain substantially parallel to one another with bending of the rollers being minimized.

BRIEF DESCRIPTION OF THE DRAWINGS

In the accompanying drawings, which illustrate exemplary embodiments of the present invention.

DETAILED DESCRIPTION

Figure 1:
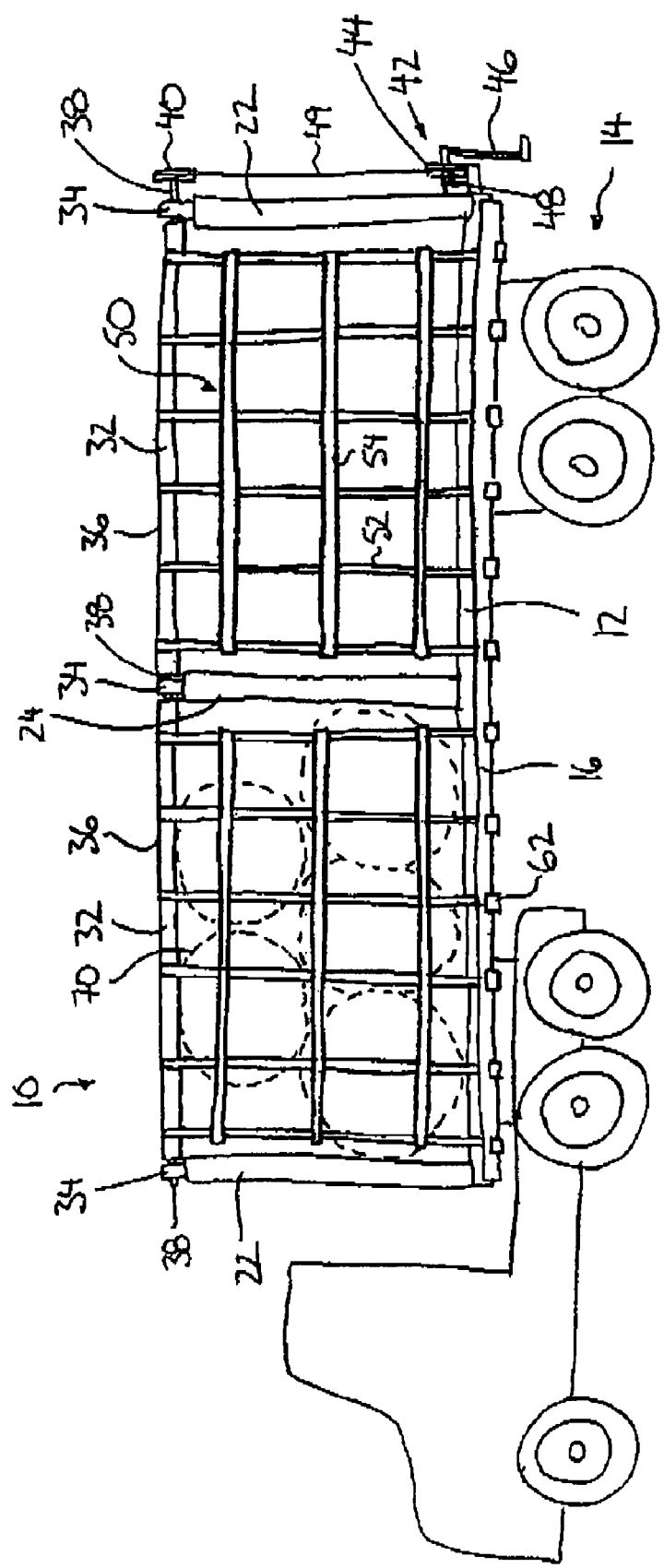
FIG. 1 is a side elevational view of a trailer upon which the strapping system is mounted.
Figure 2:
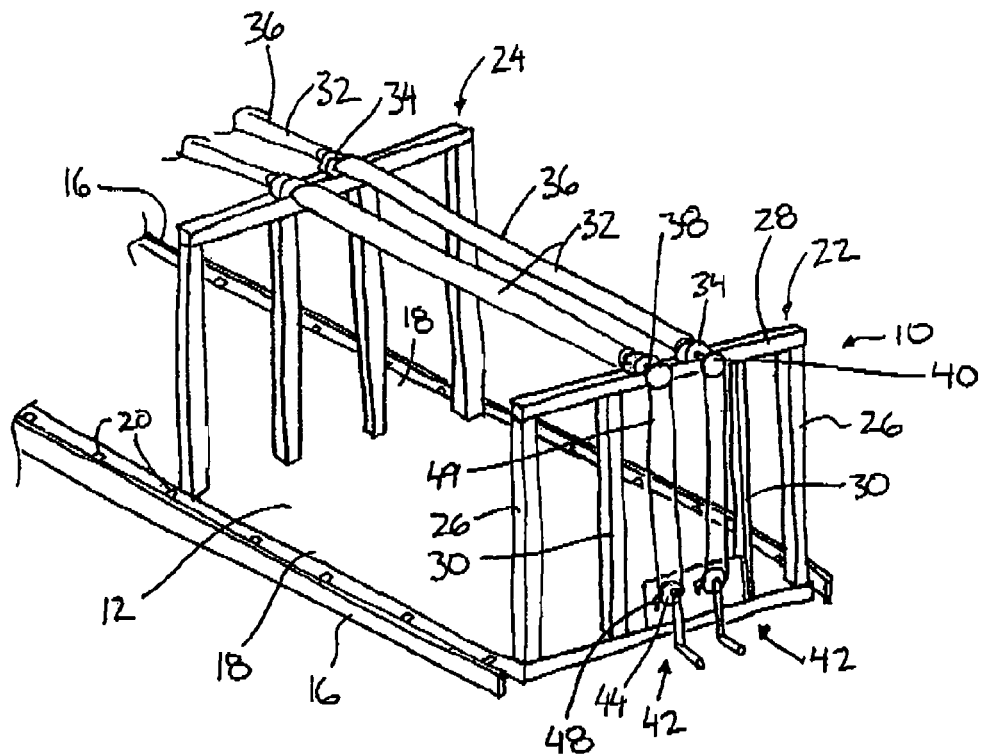
FIG. 2 is a perspective view of some of the components of the strapping system.
Figure 3:
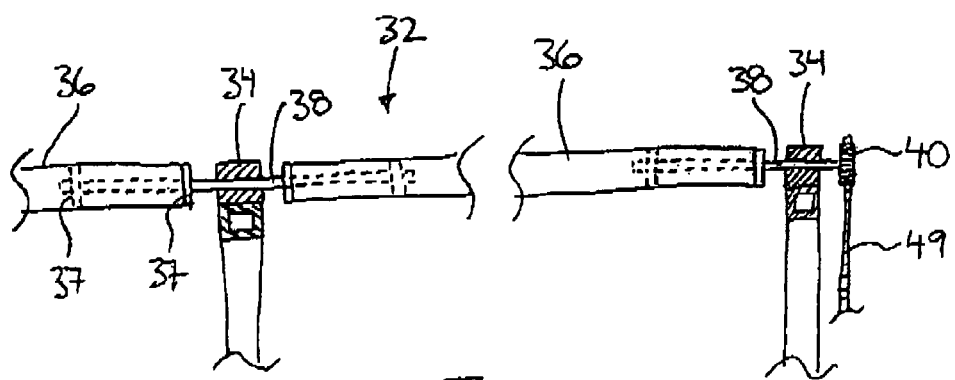
FIG. 3 is a side elevational view of one of the rollers.
Figure 4:
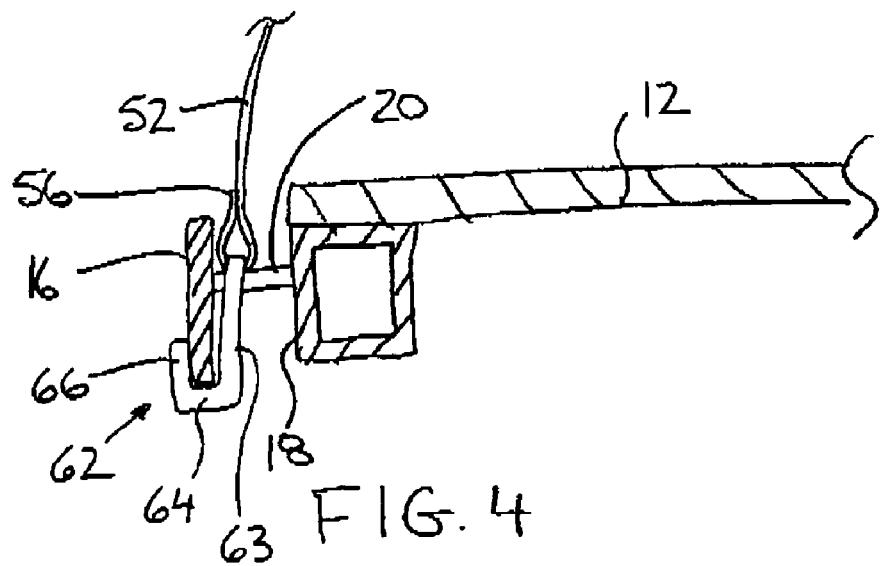
FIG. 4 is a sectional view of one of the rails with an anchor secured thereto.
Figure 5:
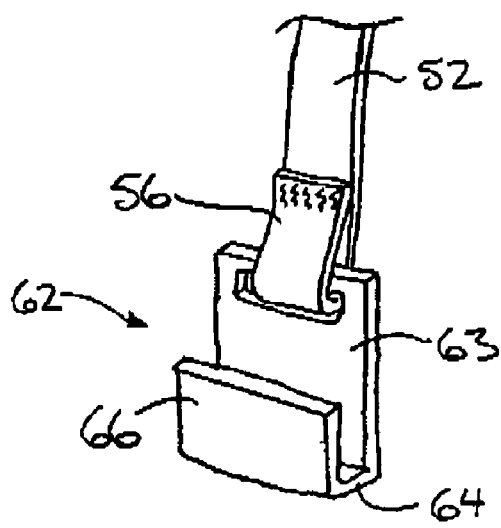
FIG. 5 is a perspective view of one of the anchors.
Figure 6:
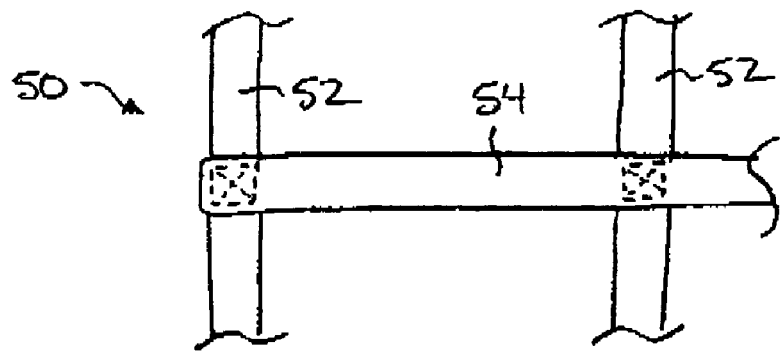
FIG. 6 is a plan view of a portion of the strapping.
Figure 7:
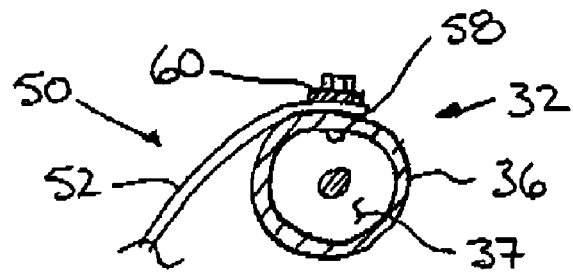
FIG. 7 is a sectional view of one of the rollers illustrating the strapping secured thereto.
Figure 8:
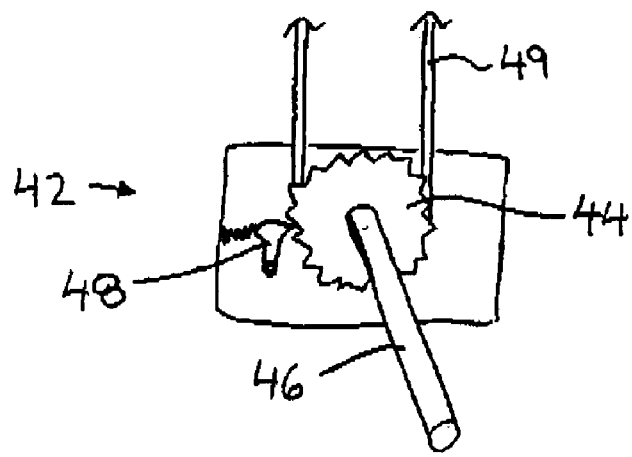
FIG. 8 is an elevational view of the tightener.

Referring to the accompanying drawings, there is illustrated a strapping system generally indicated by reference numeral 10. The system 10 is particularly suited for strapping a load 70 to the deck 12 of a transport vehicle, for example a flat bed trailer or a flat bed truck which supports large round bales thereon.

In the illustrated embodiment a flat bed trailer 14 is disclosed in which the deck is elongate and supported for rolling movement along the ground in a longitudinal direction of the deck. The trailer includes a pair of rails 16 which are mounted parallel and spaced outwardly from respective longitudinally extending sides 18 of the deck. The rails 16 are supported on the deck by spaced mounting bars 20 spanning therebetween at spaced positions along the deck. The trailer is a typical example of flat bed trailers used for hauling large round bales.

The strapping system has a frame including two end supports 22 and one or more intermediate supports 24 spaced between the end supports 22. Each of the supports is formed of square tubes of two inch in cross section which are welded together and secured to the deck by suitable bolting or welding.

Each support includes a pair of side posts 26 vertically oriented at respective sides of the deck and joined at their top ends by a cross bar 28 extending horizontally between the side posts 26 perpendicularly to the longitudinal direction of the deck. One or more intermediate posts 30 are provided which span between the deck and the cross bar 28 for additional support.

A pair of rollers 32 are provided which are supported on the frame parallel to one another to extend in the longitudinal direction of the deck. The rollers are supported near the centre of the deck spaced slightly from one another and spaced well above the deck for receiving the load therebeneath which is supported on the deck. In the illustrated embodiment, the rollers are sufficiently spaced from the deck to receive two stacked rows of large round bales therebetween. Spacing between the rollers may vary between a few inches and a few feet.

Each roller 32 is supported on the supports 22 and 24 by respective bearings 34 which are fixed onto the supports at fixed spacing from one another. The rollers 32 remain rotatable in the bearings 34 about respective longitudinal axes of the rollers.

Each roller includes a tubular body formed in sections 36 in which each section 36 extends between an adjacent pair of the supports 22 and 24. A rod 38 is concentrically mounted with the sections 36 of the tubular body at each end of the roller and between adjacent sections 36. The rods are rotatably seated within the respective bearings 34.

Each rod overlaps the end of the respective section of the tubular body by one or two feet at the junction of each. Circular plates 37 are fitted within the tubular body sections at each end and spaced slightly inwardly therefrom for concentrically receiving the respective rod 38 therethrough so that the tubular body sections 36 are adequately supported in relation to the respective rods with the rods 38 and the sections 36 of each roller being fixed for rotation together.

At the rear of each roller 32 the rod 38 projects rearwardly beyond the respective bearing 34 for mounting a driven gear 40 thereon. The driven gear is fixed to the rod for a rotation with the respective roller. A tightener 42 in the form of a tightening mechanism is provided at the rear of the deck 12 in association with each of the rollers 32. The tightener includes a drive gear 44 which is rotated by a crank arm 46 and which engages a ratchet mechanism 48. The drive gear 44 drives rotation of the driven gear 40 by action of a chain drive 49. In operation, manual rotation of the crank arm 46 in a tightening direction causes the ratchet mechanism 48 to be deflected so that the drive gear 44 rotates the driven gear 40 by action of the chain drive 49. Rotation in the reverse direction is prevented by the ratchet mechanism 48 until the ratchet mechanism is manually released.

Strapping 50 is secured on each of the rollers 32 to span between the roller and a respective side of the deck 12. The strapping on each roller comprises a web of vertical straps 52 and horizontal straps 54 which are joined at the intersection thereof.

Vertical straps are provided at a spacing of approximately two feet from one another, whereas the horizontal straps span the vertical straps at spacings of approximately two feet, five feet and eight feet from the free ends 56 of the strapping so that when secured overtop of a load one horizontal strap extends near the base of the load, another extends across the middle of the load and a third strap extends near the top of the load.

The inner ends 58 of the vertical straps 52 forming the strapping are secured to the roller by a flat bar 60 bolted alongside the tubular sections 36 on the roller by fasteners which are received in threaded holes in the tubular body. The straps are thus secured between the flat bar 60 and the outer circumference of the sections 36 of the tubular body of the rollers.

The outer free end 56 of each vertical strap of the strapping 50 locates a hook 62 thereon. The hooks 62 are configured for gripping the respective rails 16 extending alongside the deck. Each hook comprises a flat rear portion 63, a bottom portion 64 and a hook portion 66 oriented in a U-shaped configuration to define a wide flat hook suitable for securement to a rail in the form of a flat bar.

An aperture formed in the rear portion 63 permits the respective vertical strap 52 to be received therethrough and sewn to itself. Each of the straps is a two inch wide strap formed of flexible material having a tensile strength in the order of 5000 lbs.

The trailer 14 in the illustrated embodiment is suitably arranged for supporting a load 70 such as large round bales supported on the deck 12 in a safe and secure manner. Once the load is supported on the deck, the strapping 50 is unrolled from the respective rollers to hang from the respective sides of the deck by action of the crank with the ratchet mechanism 48 released. Once the hooks 62 are secured along the respective rails, rotation of each tightener in a tightening direction causes the strapping to be rolled onto the rollers respectively until the free end portions of the strapping span between the respective rails and the roller under tension with the load being compressed against the deck beneath the strapping. Each side of the deck permits all of the strapping to be secured under tension with a single tightening operation of one of the tighteners 42.

In further embodiments the tightener 42 may be replaced with hydraulic or electric motors so that tightening is an automated operation. Furthermore the tighteners may be replaced with rod type cranking mechanisms connected directly to the free ends of the roller. In addition, depending upon the size of the deck, plural intermediate supports may be provided at evenly spaced positions between the end supports to ensure that the rollers are adequately supported with minimal bending thereof.

Figure 9:
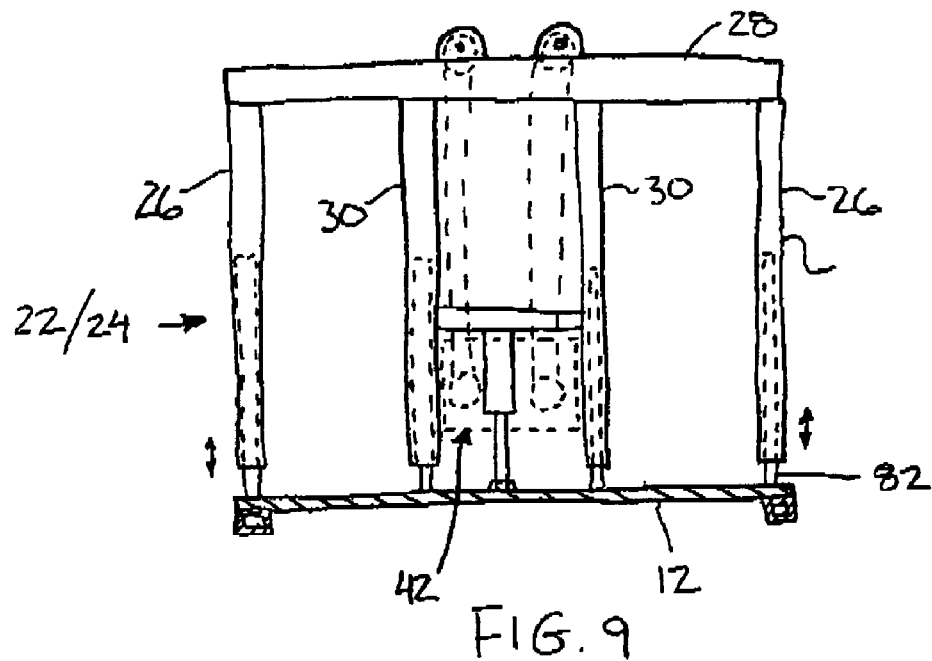
FIG. 9 is an elevational view of a height adjustable embodiment of the frame.

Turning now to FIG. 9, a further embodiment of the frame is illustrated in which each of the end supports 22 and intermediate supports 24 is height adjustable. The side posts 26 and intermediate posts 30 of each support 22 and 24 are telescopic, including a narrow base portion 80 and a wider upper portion 82 slidably received overtop of the base portion for relative sliding movement therebetween. One or more hydraulic piston cylinders 84 are coupled between the deck and the upper portions 82 of the posts to control extension and contraction of the posts so as to adjust the height of the cross bars 28 relative to the deck. The tightener 42 is coupled to the upper portions of the posts and the rollers are supported on the cross bar 28 so that the tightener 42 and rollers are movable together with the upper portions of the posts and the cross bar relative to the base portions 80 of the posts and the deck 12.

Figure 10:
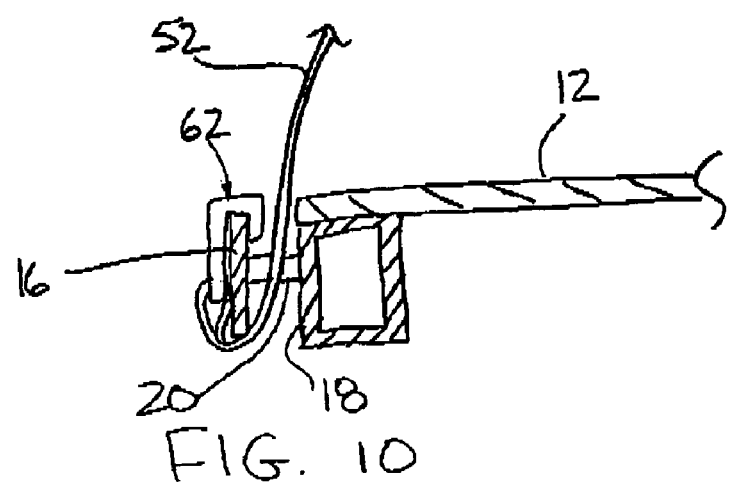
FIG. 10 is a section view of an alternate method of securing the anchors to the rails.

A variant of the mounting of the hooks 62 to the respective rails 16 is illustrated in FIG. 10. To prevent unintentional release of the hooks, the straps 52 are wrapped around a bottom edge of the rails with the hooks being secured over the top edge of the rails. Accordingly, if there is no tension on the strap, the hooks remain secured over top of the rails ready for tightening instead of falling loosely from the bottom edge of the rails.

While various embodiments of the present invention have been described in the foregoing, it is to be understood that other embodiments are possible within the scope of the invention. The invention is to be considered limited solely by the scope of the appended claims.

The invention claimed is:

1. A strapping system for an elongate deck supported for rolling movement along the ground in a longitudinal direction of the deck for transporting loads supported thereon, the system comprising:
   a pair of elongate rollers;
   a frame for supporting the rollers parallel to one another to extend in the longitudinal direction of the deck spaced above the deck, each roller being supported on the frame for rotation about a respective longitudinal axis;
   strapping members, each secured to a respective one of the rollers at respective inner ends thereof and spanning outwardly to respective free outer ends thereof;
   anchors supported at the free outer ends of the respective strapping members for securing the strapping members along respective sides of the deck; and
   a tightening mechanism coupled to the rollers to rotate the rollers for tensioning the strapping members spanning between the rollers and the respective sides of the deck when the strapping members are rolled onto the respective rollers.

2. The system according to claim 1 wherein the strapping members secured on each roller comprise a web of vertical straps and horizontal straps.

3. The system according to claim 2 wherein the vertical straps and the horizontal straps are connected at each intersection.

4. The system according to claim 2 wherein one of the anchors is supported at a free end of each of the vertical straps.

5. The system according to claim 1 wherein the anchors each comprise a hook for securement to a rail extending along a respective side of the deck.

6. The system according to claim 1 wherein the tightening mechanism comprises a crank coupled to at least one of the rollers and a ratcheting mechanism connected to the crank.

7. The system according to claim 6 wherein the tightening mechanism is coupled to said at least one of the rollers by a chain drive.

8. The system according to claim 1 wherein each roller comprises a tubular body supported about a rod member projecting concentrically from the tubular body at respective ends thereof, the rod members being received in respective bearings supporting the roller on the frame.

9. The system according to claim 1 wherein the frame includes a pair of end supports for being supported at opposing ends of the deck, the rollers being supported by respective bearings on each of the end supports.

10. The system according to claim 9 wherein there is provided an intermediate support for being supported on the deck spaced between the end supports, the rollers being supported in sections spanning between the supports and being supported by respective bearings on the intermediate support.

11. The system according to claim 1 in combination with a trailer comprising the elongate deck supported for rolling movement along the ground in a longitudinal direction of the deck for transporting loads supported thereon.

12. A method of strapping a load supported on an elongate deck which is supported for rolling movement along the ground in a longitudinal direction of the deck, the method comprising:
   providing a pair of elongate rollers supported parallel to one another to extend in the longitudinal direction of the deck spaced above the deck for rotation about a respective longitudinal axis;
   providing strapping members, each secured to a respective one of the rollers at respective inner ends thereof and spanning outwardly to respective free outer ends thereof;
   anchoring the free outer ends of the respective strapping members along respective sides of the deck;
   rotating the rollers to provide tension to the strapping members spanning between the rollers and the respective sides of the deck as the strapping members are rolled onto the respective rollers.

13. The method according to claim 12 wherein the strapping members secured on each roller comprise a web of vertical straps and horizontal straps connected at each intersection therebetween.

14. The method according to claim 13 including anchoring a free end of each of the vertical straps to the sides of the deck.

15. The method according to claim 12 including providing a rail extending along a respective side of the deck and anchoring the strapping members to the rail.

16. The method according to claim 12 including providing a crank and a ratcheting mechanism connected to the rollers for providing tension to the strapping members.

17. The method according to claim 16 including coupling the crank to at least one of the rollers by a chain drive.

18. The method according to claim 12 wherein each roller comprises a tubular body supported about a rod member projecting concentrically from the tubular body at respective ends thereof the method including providing a frame to support the rollers on the deck and supporting the rod members in respective bearings on the frame.

19. The method according to claim 12 including providing a frame to support the rollers on the deck, the frame including a pair of end supports supported at opposing ends of the deck, the rollers being supported by respective bearings on each of the end supports.

20. The method according to claim 19 wherein the frame includes an intermediate support supported on the deck spaced between the end supports, the rollers being supported in sections spanning between the supports and being supported by respective bearings on the intermediate support.

* * * * *